United States Patent
Chevuru et al.

(10) Patent No.: US 12,293,321 B2
(45) Date of Patent: May 6, 2025

(54) SYSTEMS AND METHODS FOR KNOWLEDGE GRAPH-ENABLED CROSS-DOMAIN ANALYTICS USING MACHINE LEARNING

(71) Applicant: Honeywell International Inc., Charlotte, NC (US)

(72) Inventors: Nagarjuna Reddy Chevuru, Bangalore (IN); Sanjay Baronia, South Grafton, MA (US)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 122 days.

(21) Appl. No.: 18/057,712

(22) Filed: Nov. 21, 2022

(65) Prior Publication Data
US 2024/0104480 A1      Mar. 28, 2024

(30) Foreign Application Priority Data
Sep. 26, 2022   (IN) .............................. 202211055080

(51) Int. Cl.
*G06Q 10/06* (2023.01)
*G06N 5/02* (2023.01)
*G06Q 10/0639* (2023.01)

(52) U.S. Cl.
CPC ......... *G06Q 10/06393* (2013.01); *G06N 5/02* (2013.01)

(58) Field of Classification Search
CPC .................................................. G06Q 10/06
USPC ........................................................ 705/7.39
See application file for complete search history.

(56) References Cited

U.S. PATENT DOCUMENTS

| | | | |
|---|---|---|---|
| 2020/0265324 A1* | 8/2020 | Ferreira Moreno | ... G06N 5/022 |
| 2023/0067828 A1* | 3/2023 | Pandit | ... G06F 40/284 |
| 2023/0179622 A1* | 6/2023 | Underwood | ... H04L 63/20 726/25 |
| 2023/0229986 A1* | 7/2023 | Cami | ... G06Q 10/06312 705/7.15 |
| 2024/0013003 A1* | 1/2024 | Hoang | ... G06F 40/279 |

* cited by examiner

*Primary Examiner* — Nga B Nguyen
(74) *Attorney, Agent, or Firm* — ALSTON & BIRD LLP

(57) ABSTRACT

A method including collating data from a plurality of data sources into a first data repository; identifying, using a machine-learning model, class clusters and relationship clusters of the collated data in the first data repository; generating a domain-specific semantic model as a graph-structured data model based on the identified class clusters and relationship clusters; generating a data object model using the domain-specific semantic model and the collated data in the first data repository; creating a first domain-specific knowledge graph by associating the data object model with the domain-specific semantic model; creating a cross-domain analytics knowledge graph for deriving insights involving cross-domain analytics by merging the first domain-specific knowledge graph with a second domain-specific knowledge graph created from a second data repository; and deriving insights corresponding to performance of one or more of an asset or a process in a facility based on utilization of the cross-domain analytics knowledge graph.

18 Claims, 12 Drawing Sheets

SYSTEMS AND METHODS FOR KNOWLEDGE GRAPH-ENABLED CROSS-DOMAIN ANALYTICS USING MACHINE LEARNING

CROSS-REFERENCE TO RELATED APPLICATION

This application claims the benefit of priority under 35 U.S.C. § 119 from Indian Patent Application No. 202211055080, filed on Sep. 26, 2022, the entirety of which is incorporated herein by reference.

TECHNICAL FIELD

Various embodiments of the present disclosure relate generally to creating a cross-domain analytics knowledge graph.

BACKGROUND

Organizations may onboard disparate data from a single domain and derive insights using relational technology. Organizations may have difficulty onboarding disparate data from multiple domains for cross domain analytics.

The present disclosure is directed to overcoming one or more of these above-referenced challenges.

SUMMARY OF THE DISCLOSURE

In some aspects, the techniques described herein relate to a method including: collating data from a plurality of data sources into a first data repository; identifying, using a machine-learning model to identify class clusters and relationship clusters, class clusters and relationship clusters of the collated data in the first data repository, wherein the class clusters represent relationships of data and the relationship clusters represent relationships between class clusters; generating a domain-specific semantic model as a graph-structured data model based on the identified class clusters and relationship clusters; generating a data object model using the domain-specific semantic model and the collated data in the first data repository; creating a first domain-specific knowledge graph by associating the data object model with the domain-specific semantic model; creating a cross-domain analytics knowledge graph for deriving insights involving cross-domain analytics by merging the first domain-specific knowledge graph with a second domain-specific knowledge graph created from a second data repository; and deriving insights corresponding to performance of one or more of an asset or a process in a facility based on utilization of the cross-domain analytics knowledge graph.

In some aspects, the techniques described herein relate to a method, wherein the identifying the class clusters and relationship clusters includes using a trained neural network of class clusters and relationship clusters as the machine-learning model.

In some aspects, the techniques described herein relate to a method, wherein the generating the domain-specific semantic model includes generating the domain-specific semantic model as a Web Ontology Language (.owl) file based on the identified class clusters and relationship clusters.

In some aspects, the techniques described herein relate to a method, wherein the generating the data object model includes generating the data object model as a Resource Description Framework (.rdf) file based on the domain-specific semantic model and the collated data in the first data repository.

In some aspects, the techniques described herein relate to a method, wherein the creating the first domain-specific knowledge graph includes creating the first domain-specific knowledge graph as a graph-structured data model based on the data object model and the domain-specific semantic model.

In some aspects, the techniques described herein relate to a method, wherein the creating the cross-domain analytics knowledge graph includes forming a relationship between at least one class of the first domain-specific knowledge graph and at least one class of the second domain-specific knowledge graph.

In some aspects, the techniques described herein relate to a method, further including: receiving a user input, and validating the identified class clusters and relationship clusters based on the received user input.

In some aspects, the techniques described herein relate to a method, wherein the deriving insights includes: querying the cross-domain analytics knowledge graph using data from the first data repository and data from the second data repository.

In some aspects, the techniques described herein relate to a method, wherein the deriving insights further includes: displaying a response based on the querying the cross-domain analytics knowledge graph.

In some aspects, the techniques described herein relate to a method, further including: providing the cross-domain analytics knowledge graph in an extensible object model in an Internet-of-Things platform.

In some aspects, the techniques described herein relate to a system including: a memory storing instructions; and one or more processors to execute the stored instructions to perform operations including: collating data from a plurality of data sources into a first data repository; identifying, using a machine-learning model to identify class clusters and relationship clusters, class clusters and relationship clusters of the collated data in the first data repository, wherein the class clusters represent relationships of data and the relationship clusters represent relationships between class clusters; generating a domain-specific semantic model as a graph-structured data model based on the identified class clusters and relationship clusters; generating a data object model using the domain-specific semantic model and the collated data in the first data repository; creating a first domain-specific knowledge graph by associating the data object model with the domain-specific semantic model; creating a cross-domain analytics knowledge graph for deriving insights involving cross-domain analytics by merging the first domain-specific knowledge graph with a second domain-specific knowledge graph created from a second data repository; and deriving insights corresponding to performance of one or more of an asset or a process in a facility based on utilization of the cross-domain analytics knowledge graph.

In some aspects, the techniques described herein relate to a system, wherein the identifying the class clusters and relationship clusters includes using a trained neural network of class clusters and relationship clusters as the machine-learning model.

In some aspects, the techniques described herein relate to a system, wherein the generating the domain-specific semantic model includes generating the domain-specific semantic model as a Web Ontology Language (.owl) file based on the identified class clusters and relationship clusters.

In some aspects, the techniques described herein relate to a system, wherein the generating the data object model includes generating the data object model as a Resource Description Framework (.rdf) file based on the domain-specific semantic model and the collated data in the first data repository.

In some aspects, the techniques described herein relate to a system, wherein the creating the first domain-specific knowledge graph includes creating the first domain-specific knowledge graph as a graph-structured data model based on the data object model and the domain-specific semantic model.

In some aspects, the techniques described herein relate to a system, wherein the creating the cross-domain analytics knowledge graph includes forming a relationship between at least one class of the first domain-specific knowledge graph and at least one class of the second domain-specific knowledge graph.

In some aspects, the techniques described herein relate to a system, wherein the operations further include: receiving a user input, and validating the identified class clusters and relationship clusters based on the received user input.

In some aspects, the techniques described herein relate to a system, wherein the deriving insights includes: querying the cross-domain analytics knowledge graph using data from the first data repository and data from the second data repository, and displaying a response based on the querying the cross-domain analytics knowledge graph.

In some aspects, the techniques described herein relate to a system, further including: providing the cross-domain analytics knowledge graph in an extensible object model in an Internet-of-Things platform.

In some aspects, the techniques described herein relate to a non-transitory computer-readable medium storing instructions that, when executed by one or more processors, cause the one or more processors to perform operations including: collating data from a plurality of data sources into a first data repository; identifying, using a machine-learning model to identify class clusters and relationship clusters, class clusters and relationship clusters of the collated data in the first data repository, wherein the class clusters represent relationships of data and the relationship clusters represent relationships between class clusters; generating a domain-specific semantic model as a graph-structured data model based on the identified class clusters and relationship clusters; generating a data object model using the domain-specific semantic model and the collated data in the first data repository; creating a first domain-specific knowledge graph by associating the data object model with the domain-specific semantic model; creating a cross-domain analytics knowledge graph for deriving insights involving cross-domain analytics by merging the first domain-specific knowledge graph with a second domain-specific knowledge graph created from a second data repository; and deriving insights corresponding to performance of one or more of an asset or a process in a facility based on utilization of the cross-domain analytics knowledge graph.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to creating a cross-domain analytics knowledge graph.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

In general, an "Internet-of-Things" or "IoT" platform for enterprise performance management uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, nodes, people, and safety. Further, the IoT platform of the present disclosure supports end-to-end capability to execute digital twins against process data and to translate the output into actionable insights, as detailed in the following description.

The IoT platform may include a number of layers including, for example, an extensible object model (EOM) that includes one or more knowledge graphs. The EOM may be a collection of application programming interfaces (APIs) that enables a seeded semantic object model to be extended. The extensible object model further enables a customer's knowledge graph to be built subject to the constraints expressed in the customer's semantic object model. A knowledge graph describes real world entities and their interrelations, organized in a graph. A knowledge graph defines possible classes and relations of entities in a schema, and enables the interrelating of potentially arbitrary entities and covers various topical domains. Knowledge graphs may include large networks of entities, their semantic types, properties, and relationships between entities. The entities may be physical entities or non-physical entities, such as data. Various embodiments of the present disclosure relate generally to creating a cross-domain analytics knowledge graph, such as for an IoT platform, for example.

Figure 1:
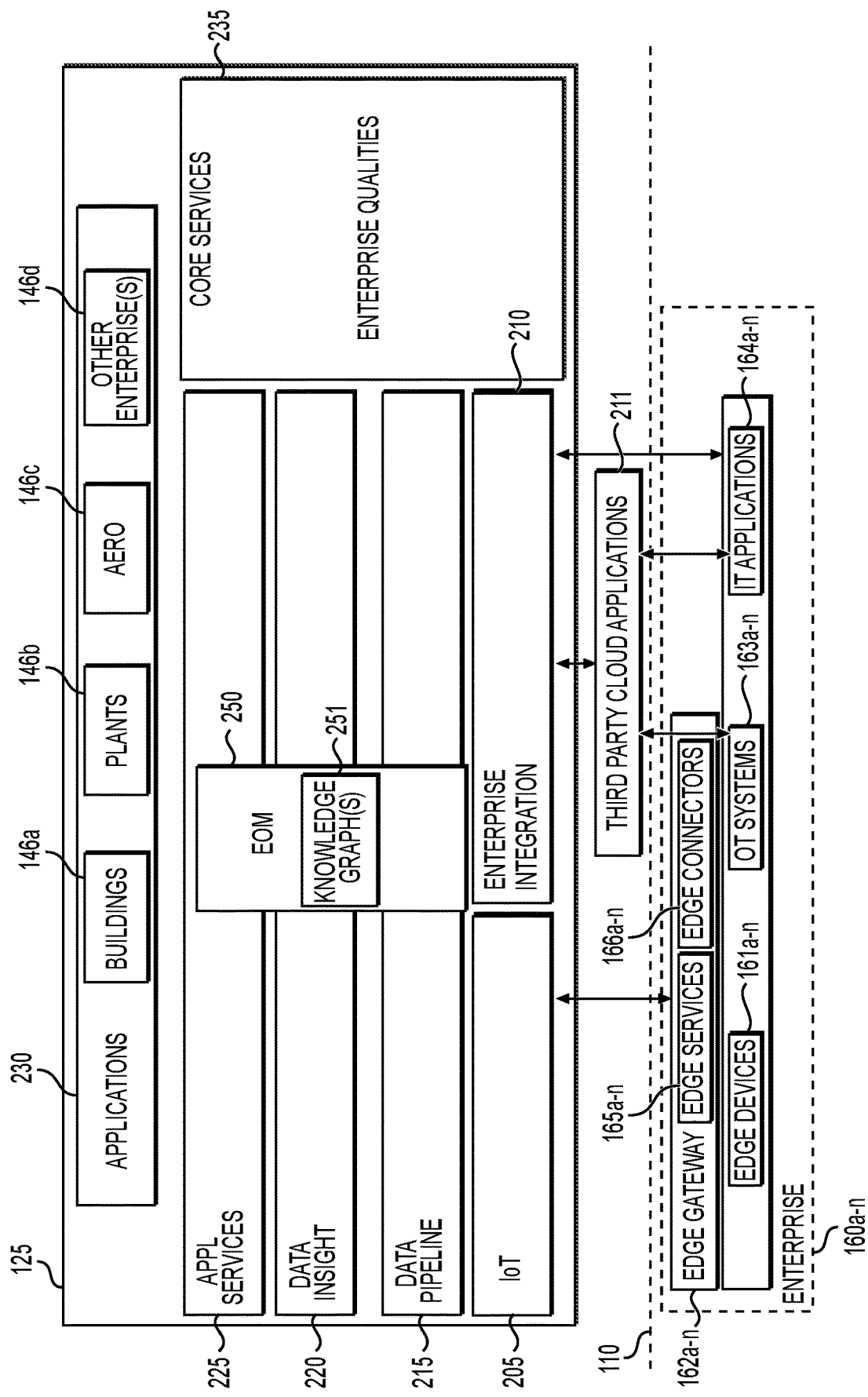
FIG. 1 depicts a schematic block diagram of a framework of an Internet-of-Things (IoT) platform comprising one or more extensible object models ("EOM") including one or more knowledge graphs.

FIG. 1 depicts a schematic block diagram of a framework of an Internet-of-Things (IoT) platform comprising one or more extensible object models ("EOM"). FIG. 1 illustrates an IoT platform 125, according to the present disclosure. The IoT platform 125 of the present disclosure is a platform for enterprise performance management that uses real-time accurate models and visual analytics to deliver intelligent actionable recommendations for sustained peak performance of the enterprise 160a-160n. The IoT platform 125 is an extensible platform that is portable for deployment in any cloud or data center environment for providing an enterprise-wide, top to bottom view, displaying the status of processes, nodes, people, and safety. Further, the IoT platform 125 supports end-to-end capability to execute digital twins against process data and to translate the output into actionable insights.

As shown in FIG. 1, the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, each layer 205-235 may include one or more of the modules, models, engines, databases, services, applications, or combinations thereof. In some embodiments, the layers 205-235 may be combined to form fewer layers. In some embodiments, some of the layers 205-235 may be separated into separate, more numerous layers. In some embodiments, some of the layers 205-235 may be removed while others may be added.

The IoT platform 125 is a model-driven architecture. Thus, the extensible object model 250 communicates with each layer 205-230 to contextualize site data of the enterprise 160a-160n using an extensible object model (or "node model") and knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 may include resource description framework (RDF) graphs. As used herein, an "RDF graph" is a graph data model that formally describes the semantics, or meaning, of information. The RDF graph can also represent metadata (e.g., data that describes data). Knowledge graphs 251 can also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the nodes (e.g., the nodes) of an enterprise (e.g., the edge devices 161a-161n) and describe the relationship of the nodes with other components (e.g., the links). The models also describe the schema (e.g., describe what the data is), and therefore the models are self-validating. For example, the model can describe the type of sensors mounted on any given node (e.g., edge device 161a-161n) and the type of data that is being sensed by each sensor. A key performance indicator (KPI) framework can be used to bind properties of the nodes in the extensible object model 250 to inputs of the KPI framework. Accordingly, the IoT platform 125 is an extensible, model-driven end-to-end stack including: two-way model sync and secure data exchange, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications that handle those devices 161a-161n. For example, when new edge devices 161a-161n are added to an enterprise 160a-160n system, the new devices 161a-161n will automatically appear in the IoT platform 125 so that the corresponding applications can understand and use the data from the new devices 161a-161n.

In some cases, node templates are used to facilitate configuration of instances of edge devices 161a-161n in the model using common structures. A node template defines the typical properties for the edge devices 161a-161n of a given enterprise 160a-160n for a certain type of device. For example, a node template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior.

The modeling phase includes an onboarding process for syncing the models. For example, the onboarding process can include a simple onboarding process, a complex onboarding process, and/or a standardized rollout process. The simple onboarding process includes the knowledge graph 251 receiving raw model data and running context discovery algorithms to generate the model. The context discovery algorithms read the context of the edge naming conventions of the edge devices 161a-161n and determine what the naming conventions refer to. For example, the knowledge graph 251 can receive "TMP" during the modeling phase and determine that "TMP" relates to "temperature." The generated models are then published. The complex onboarding process includes the knowledge graph 251 receiving the raw model data, receiving point history data, and receiving site survey data. The knowledge graph 251 can then use these inputs to run the context discovery algorithms. The generated models can be edited and then the models are published.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, data can be ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT platform 125. In some embodiments, only authorized data is sent to the IoT platform 125, and the IoT platform 125 only accepts data from authorized edge gateways 162a-162n and/or edge devices 161a-161n. Data may be sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. The IoT layer 205 may also include components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third party applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, the data pipeline layer 215 can pre-process and/or perform initial analytics on the received data. The data pipeline layer 215 executes advanced data cleansing routines including, for example, data correction, mass balance reconciliation, data conditioning, component balancing, and simulation to ensure the desired information is used as a basis for further processing. The data pipeline layer 215 also provides advanced and fast computation. For example, cleansed data is run through enterprise-specific digital twins. The enterprise-specific digital twins can include a reliability advisor containing process models to determine the current operation and the fault models to trigger any early detection and determine an appropriate resolution. The digital twins can also include an optimization advisor that integrates real-time economic data with real-time process data, selects the right feed for a process, and determines optimal process conditions and product yields.

The data pipeline layer 215 may also use models and templates to define calculations and analytics, and define how the calculations and analytics relate to the nodes (e.g., the edge devices 161a-161n). For example, a pump template can define pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. The actual calculation or analytic logic may be defined in the template or it may be referenced. Thus, the calculation model can be used to describe and control the execution of a variety of different process models. Calculation templates can be linked with the node templates such that when a node (e.g., edge device 161a-161n) instance is created, any associated calculation instances are also created with their input and output parameters linked to the appropriate attributes of the node (e.g., edge device 161a-161n).

The IoT platform 125 can support a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, the IoT platform 125 can drill down from a high-level condition to understand the contributing factors, as well as determining the potential impact a lower level condition may have. There may be multiple fault models for a given enterprise 160a-160n looking at different aspects such as process, equipment, control, and/or operations. Each fault model can identify issues and opportunities in their domain, and can also look at the same core problem from a different perspective. An overall fault model can be layered on top to synthesize the different perspectives from each fault model into an overall assessment of the situation and point to the true root cause.

When a fault or opportunity is identified, the IoT platform 125 can make recommendations about the best corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. The recommendation follow-up can be used to improve the overall knowledge of the system over time as existing recommendations are validated (or not) or new cause and effect relationships are learned by users and/or analytics.

The models can be used to accurately predict what will occur before it occurs and interpret the status of the installed base. Thus, the IoT platform 125 enables operators to quickly initiate maintenance measures when irregularities occur. The digital twin architecture of the IoT platform 125 can use a variety of modeling techniques. The modeling techniques can include, for example, rigorous models, fault detection and diagnostics (FDD), descriptive models, predictive maintenance, prescriptive maintenance, process optimization, and/or any other modeling technique.

The rigorous models can be converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. The descriptive models identify a problem and then the predictive models can determine possible damage levels and maintenance options. The descriptive models can include models for defining the operating windows for the edge devices 161a-161n.

Predictive maintenance includes predictive analytics models developed based on rigorous models and statistic models, such as, for example, principal component analysis (PCA) and partial least square (PLS). Machine learning methods can be applied to train models for fault prediction. Predictive maintenance can leverage FDD-based algorithms to continuously monitor individual control and equipment performance. Predictive modeling is then applied to a selected condition indicator that deteriorates in time. Prescriptive maintenance includes determining what the best maintenance option is and when it should be performed based on actual conditions rather than time-based maintenance schedule. Prescriptive analysis can select the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. When raw data is received at the IoT platform 125, the raw data can be stored as time series tags or events in warm storage (e.g., in a TSDB) to support interactive queries and to cold storage for archive purposes. Data can further be sent to the data lakes for offline analytics development. The data pipeline layer 215 can access the data stored in the databases of the data insight layer 220 to perform analytics, as detailed above.

The application services layer 225 includes one or more components for rules engines, workflow/notifications, KPI framework, BI, machine learning, and/or an API for application services. The application services layer 225 enables building of applications 146a-d. The applications layer 230 includes one or more applications 146a-d of the IoT platform 125. For example, the applications 146a-d can include a buildings application 146a, a plants application 146b, an aero application 146c, and other enterprise applications 146d. The applications can include general applications for portfolio management, node management, autonomous control, and/or any other custom applications. Portfolio management can include the KPI framework and a flexible user interface (UI) builder. Node management can include node performance and node health. Autonomous control can include energy optimization and predictive maintenance. As detailed above, the general applications can be extensible such that each application can be configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. The core services layer 235 can include data visualization, data analytics tools, security, scaling, and monitoring. The core services layer 235 can also include services for tenant provisioning, single login/common portal, self-service admin, UI library/UI tiles, identity/access/entitlements, logging/monitoring, usage metering, API gateway/dev portal, and the IoT platform 125 streams.

As described above, EOM 250 and knowledge graphs 251 of FIG. 1 may be central to the definition of relationships between devices and nodes of the network. Accordingly, exemplary functions and features of a knowledge graph 251 of an EOM 250 consistent with the present disclosure will now be described.

Figure 2:
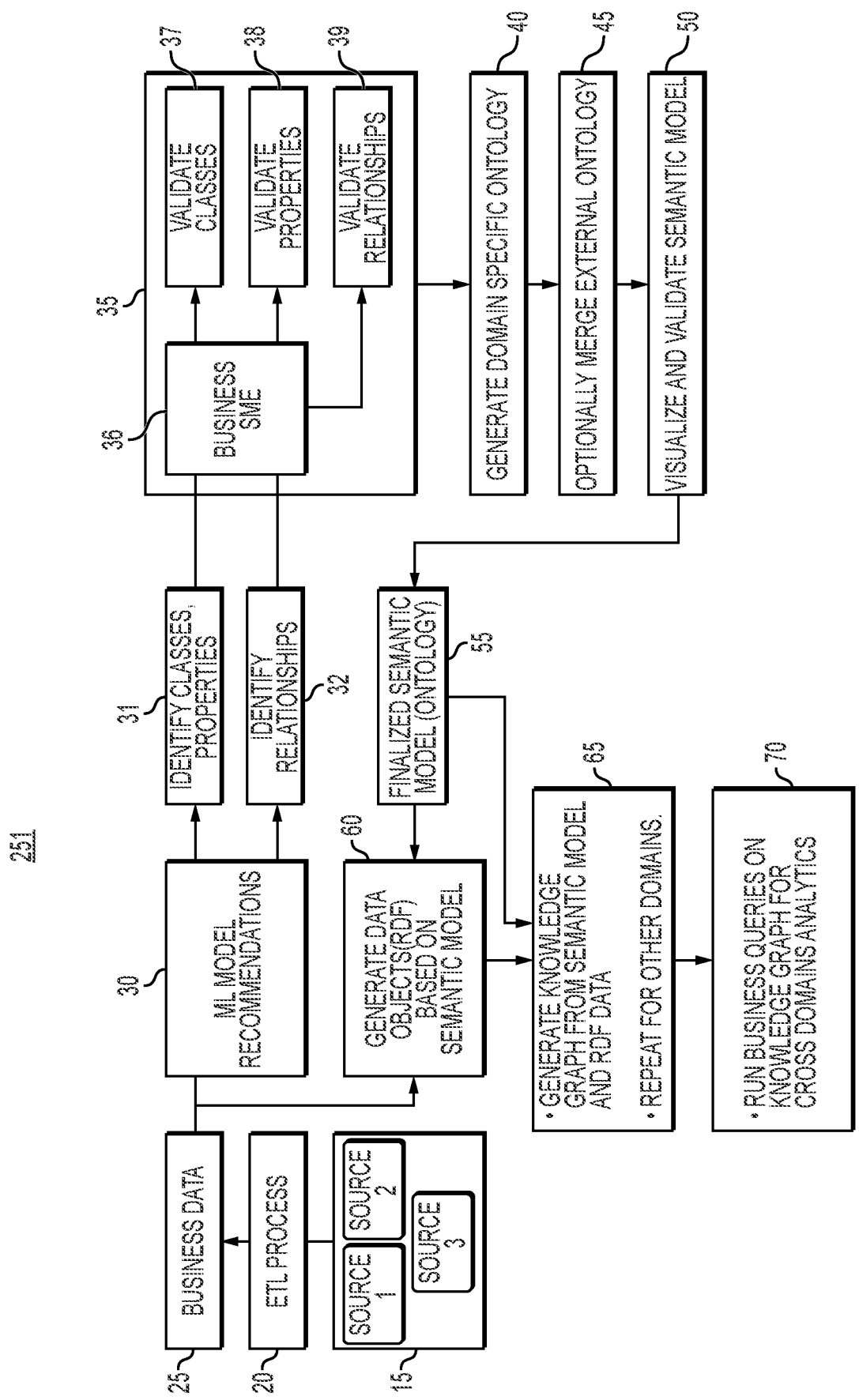
FIG. 2 depicts an exemplary system infrastructure for creating a cross-domain analytics knowledge graph, according to one or more embodiments.

FIG. 2 depicts an exemplary system infrastructure for creating a cross-domain analytics knowledge graph 251, according to one or more embodiments. As shown in FIG. 2, knowledge graph 251 may be created, in part, from source data 15. Source data 15 may include data from several sources, such as source 1, source 2, and source 3, through data pipeline layer 215, for example. Source data 15 may be in the form of several separate spreadsheet files, for example. However, the disclosure is not limited thereto. Using an extract/transform/load (ETL) process 20, source data 15 may be collated as business data 25. Business data 25 may be a centralized and de-normalized data repository for source data 15. Business data 25 may be in the form of a column-oriented database, for example. However, the disclosure is not limited thereto.

Machine-learning model 30 may provide recommendations for clustering business data 25. Machine-learning model 30 may identify classes and properties 31 and may identify relationships 32 in business data 25. The machine learning algorithm that may be useful and effective for the analysis is a neural network, which is a type of supervised machine learning. However, other machine learning techniques and frameworks may be used to perform the methods contemplated by the present disclosure. For example, the systems and methods may be realized using other types of supervised machine learning, such as regression problems or random forest, for example, using unsupervised machine learning such as cluster algorithms or principal component analysis, for example, and/or using reinforcement learning. The machine learning algorithm may alternatively or additionally be rule-based.

Validation 35 may be performed by the machine learning algorithm or may be performed by a business subject matter expert (SME) 36, and may include a validation 35 of the identified classes and properties 31 and relationships 32. Validation 35 may include class validation 37, property validation 38, and relationship validation 39 of the identified classes and properties 31 and relationships 32. Ontology generator 40 may generate a domain-specific ontology based on the validated clusters from validation 35. Ontology generator 40 may also include external ontology merger 45 to merge an external ontology with the generated domain-specific ontology. Here, ontology refers to a representation, formal naming, and definition of the categories, properties, and relations in business data 25. Ontology may also be referred to as a semantic model, where the semantic model is a method of structuring data in order to represent the data in a specific logical way, but does not include the data itself. The semantic model visualizer 50 may provide an interface for visualization and validation of the generated ontology as a finalized semantic model 55. Finalized semantic model 55 may be a Web Ontology Language (.owl) file. However, the disclosure is not limited thereto.

Data object generator may generate a data object model 60 using finalized semantic model 55 and business data 25. The generated data object model 60 may be a Resource Description Framework (.rdf) file. The Data object generator may receive inputs including de-normalized business data for a single domain and a semantic model of a single, same domain in semantic web standards (such as OWL, RDFS). The Data object generator may read the de-normalized business data, create objects for the classes with respect to the defined semantic model, and provide the data object model 60 in the form of semantic web standards. However, the disclosure is not limited thereto. Knowledge graph generator 65 may combine, or associate, generated data object model 60 from business data 25 with finalized semantic model 55 to create a knowledge graph for a single domain. The process may be repeated for other domains, with data different from data in source data 15, to create additional knowledge graphs. Knowledge graphs from multiple domains may be merged to create cross-domain analytics knowledge graph 251. Cross-domain analytics may include using query analyzer 70, through application services layer 225, for example, to provide cross-domain analytics from knowledge graph 251. Knowledge graph 251 may be used in EOM 250 of IoT platform 125, for example.

Figure 3:
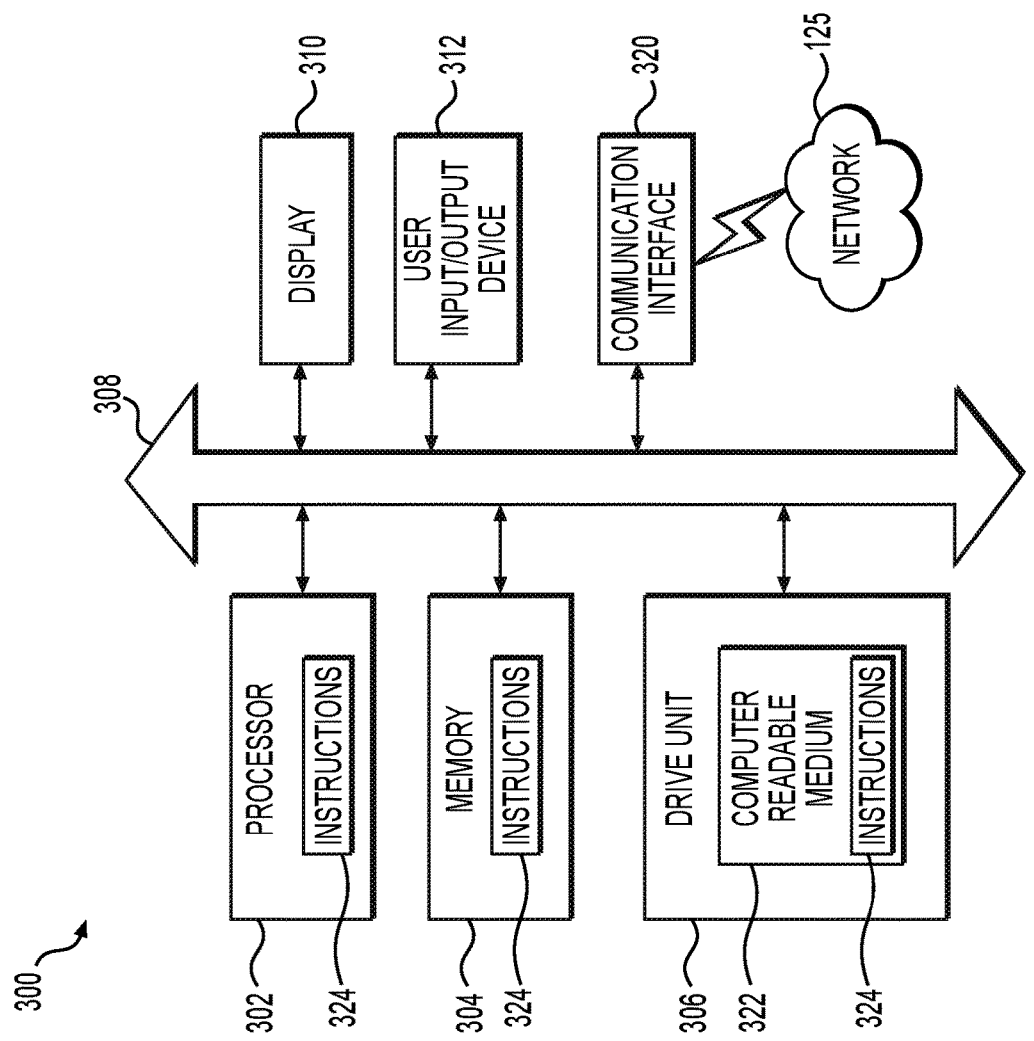
FIG. 3 depicts an implementation of a controller that may execute techniques presented herein, according to one or more embodiments.

FIG. 3 depicts an implementation of a controller 300 that may execute techniques presented herein, according to one or more embodiments. The controller 300 may include a set of instructions that can be executed to cause the controller 300 to perform any one or more of the methods or computer based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
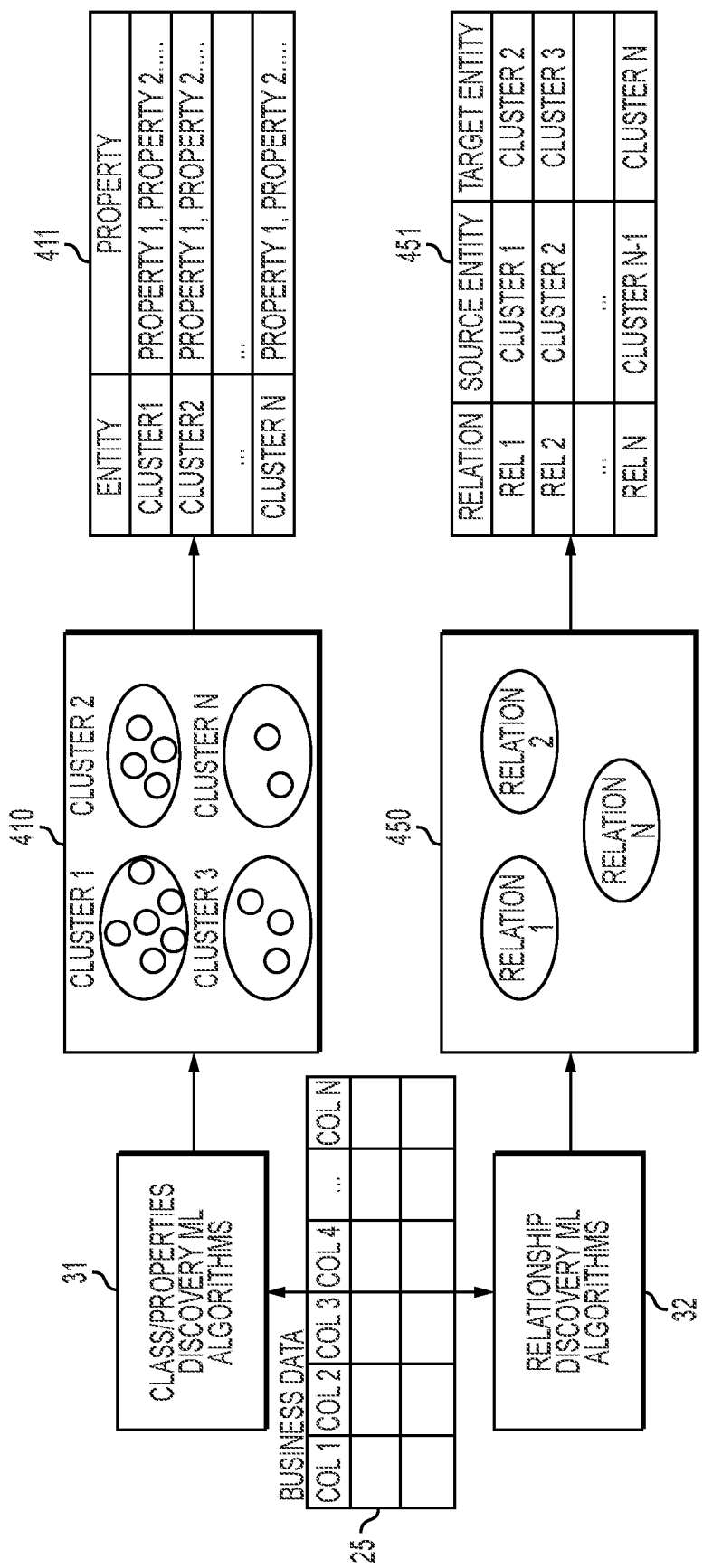
FIG. 4 depicts an implementation of machine learning model 30 of FIG. 2, according to one or more embodiments.

FIG. 4 depicts an implementation of machine-learning model 30, according to one or more embodiments. As shown in FIG. 4, machine-learning model 30 may provide recommendations for clustering business data 25. Machine-learning model 30 may identify classes and properties 31 and may identify relationships 32 in business data 25. Machine-learning model 30 may identify classes and properties 31 in business data 25 as class clusters 410, including clusters 1-N. In class clusters 410, each circle inside each cluster may represent a column heading in business data 25, for example. Class clusters 410 may be clustered into a class ontology 411 including entities (e.g. clusters) and properties (e.g. column headings) for each entity. Machine-learning model 30 may identify relationships 32 in business data 25 as relationship clusters 450, including relationship clusters 1-N. Relationship clusters 450 may be clustered into a relationship ontology 451 including relationships between source entities and target entities (e.g. clusters).

Figure 5:
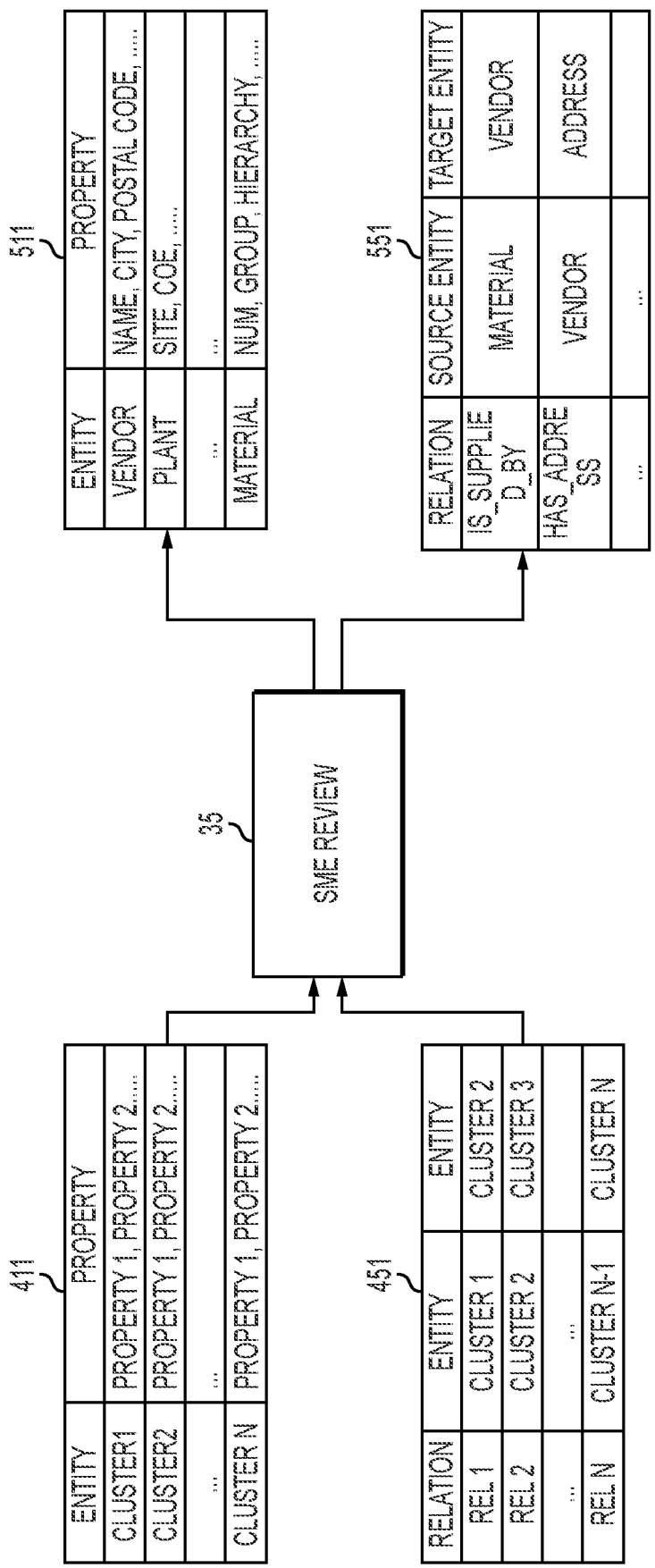
FIG. 5 depicts an implementation of validation 35 of FIG. 2, according to one or more embodiments.

FIG. 5 depicts an implementation of validation 35, according to one or more embodiments. As shown in FIG. 5, validation 35 may validate and further describe class ontology 411 and relationship ontology 451 as validated class ontology 511 and validated relationship ontology 551. For example, a generic entity name "Cluster1" may be identified by machine-learning model 30 in class ontology 411. Validation 35 may change entity name "Cluster1" to "Vendor" based on, for example, a recognition of the properties (e.g. column headings) for the entity name "Cluster1". As an additional example, a generic relationship name "Rel1" may be identified by machine-learning model 30 in relationship ontology 451. Validation 35 may change relationship name "Rel1" to "IS_SUPPLIED_BY" based on, for example, a recognition of the relationship between the source entity ("Material") and target entity (now "Vendor").

Figure 6:
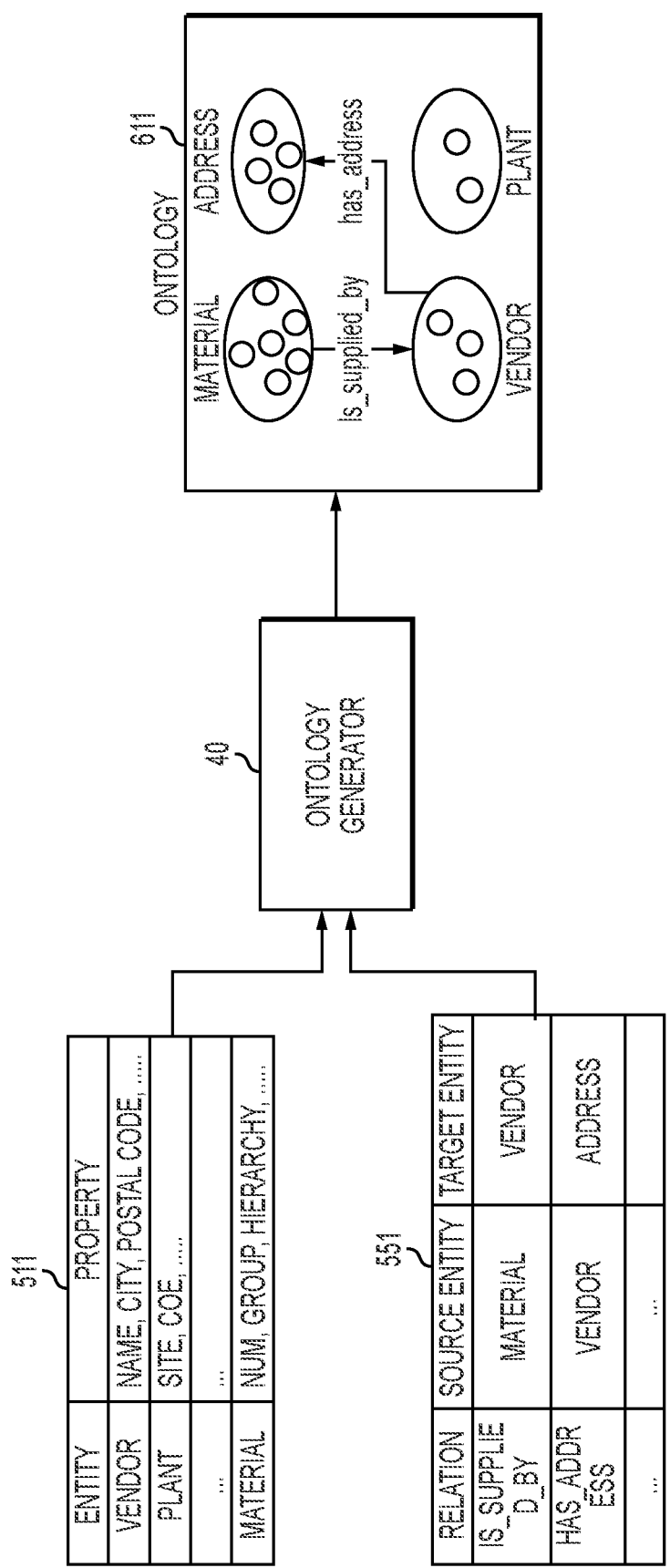
FIG. 6 depicts an implementation of ontology generator 40 of FIG. 2, according to one or more embodiments.

FIG. 6 depicts an implementation of ontology generator 40, according to one or more embodiments. Ontology generator 40 may receive a predefined template for class objects and relationships. The classes, properties and relationships may be derived from a machine-learning model and reviewed. Ontology generator 40 may receive the template as input, generate the semantic model with respect to semantic web standards (OWL, RDFS), and provide the semantic model as an output.

As shown in FIG. 6, ontology generator 40 may generate semantic model 611 from class ontology 511 and validated relationship ontology 551. Semantic model 611 may include both classes and properties 31 in business data 25 and the relationships 32 between the classes and properties 31. For example, semantic model 611 may show that entity "Material" may have a relationship ("IS_SUPPLIED_BY") with entity "Vendor" (including properties such as Name, City, and Postal Code).

Figure 7:
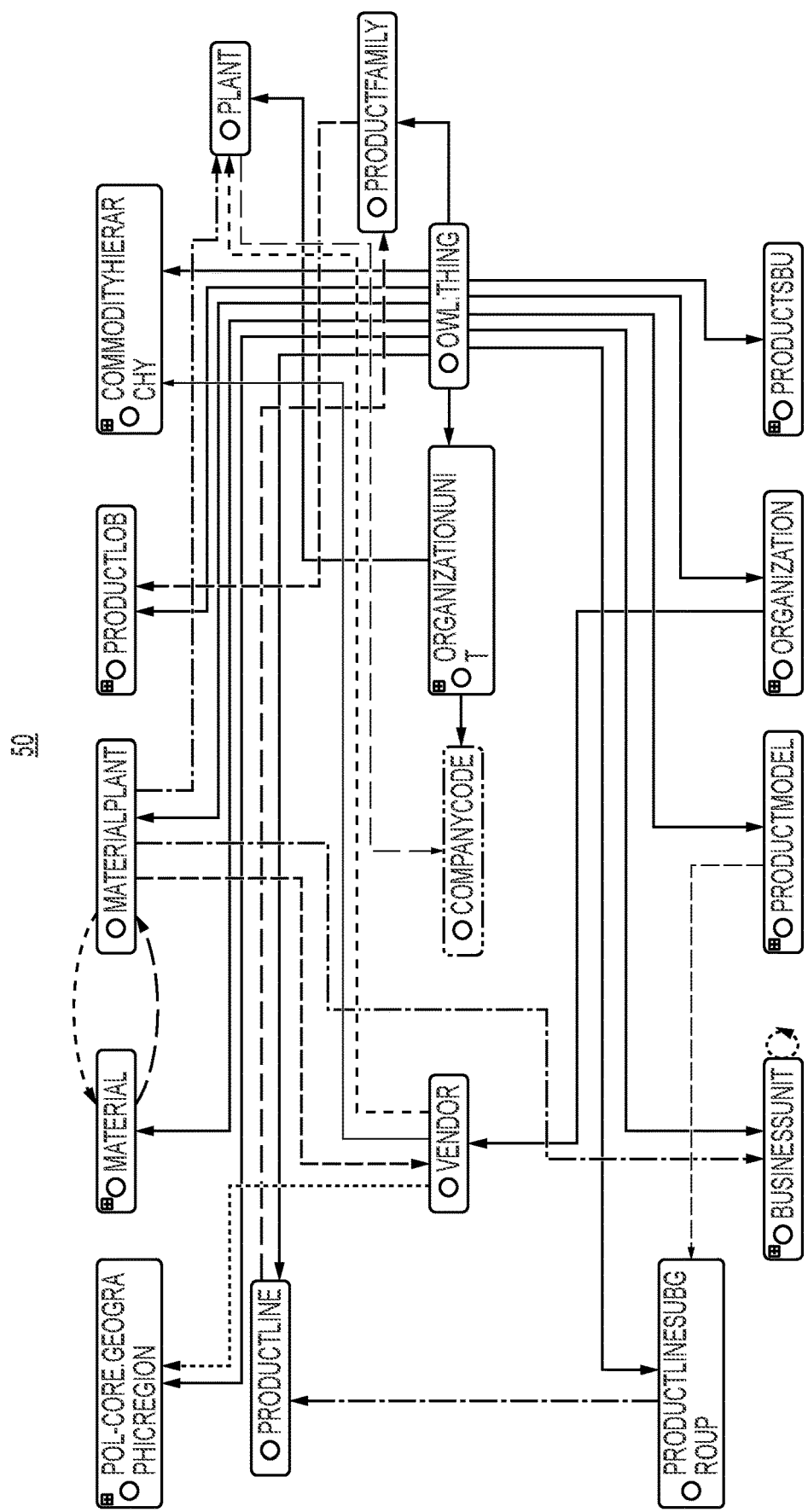
FIG. 7 depicts a semantic model visualizer 50 of FIG. 2 for semantic model 611 validated as finalized semantic model 55, according to one or more embodiments.

FIG. 7 depicts a semantic model visualizer 50 of semantic model 611 validated as finalized semantic model 55, according to one or more embodiments. As shown in FIG. 7, semantic model 611 may include root class "owl:Thing" connected by various relationships (from relationship ontology 551) to other classes (from class ontology 511). Semantic model 611 may be validated as finalized semantic model 55. The semantic model visualizer 50 may provide an interface for visualization and validation of the generated ontology as finalized semantic model 55. Finalized semantic model 55 may be a Web Ontology Language (.owl) file. Data object generator may generate a data object model 60 using finalized semantic model 55 and business data 25. The generated data object model 60 may be a Resource Description Framework (.rdf) file. However, the disclosure is not limited thereto.

Figure 8:
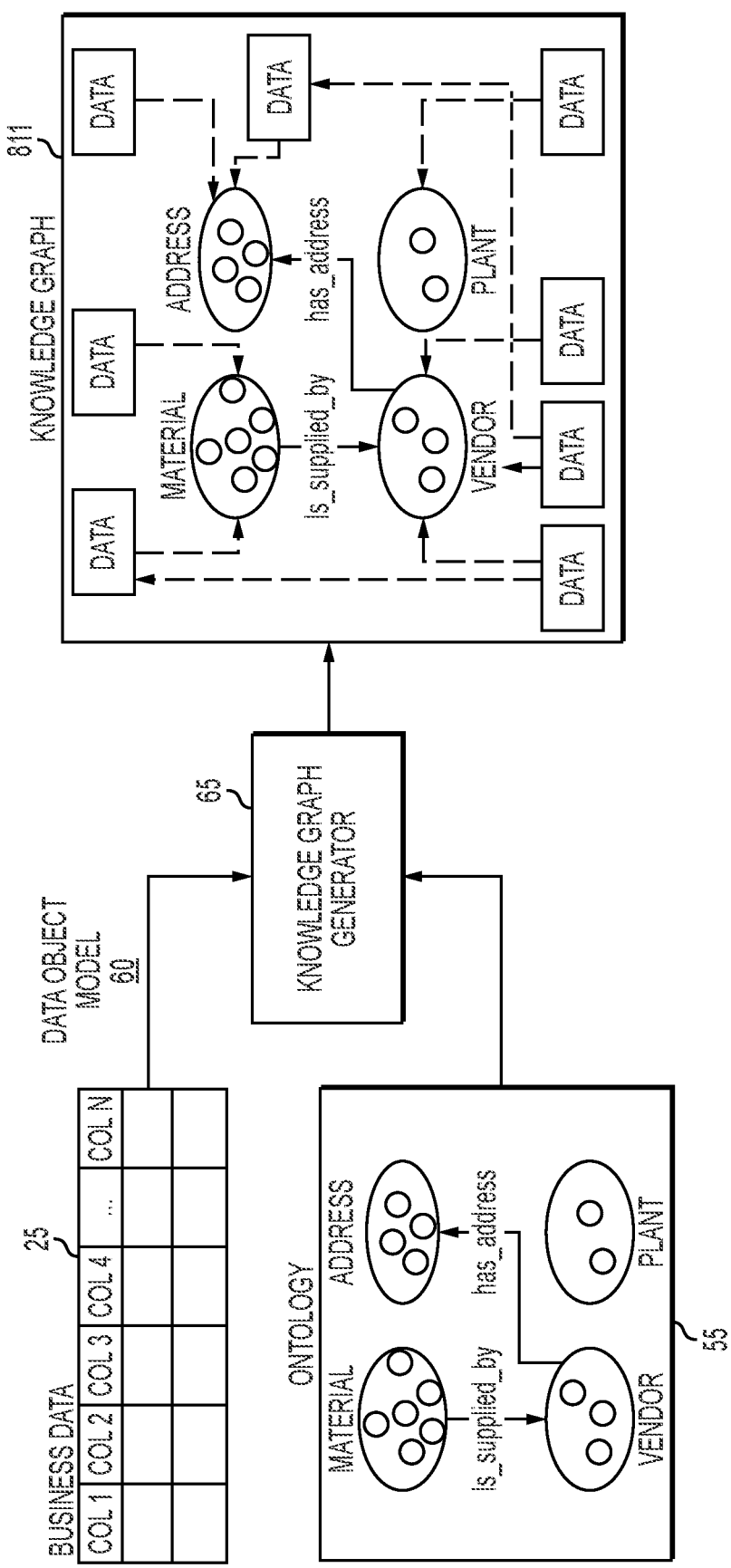
FIG. 8 depicts an implementation of knowledge graph generator 65 of FIG. 2, according to one or more embodiments.

FIG. 8 depicts an implementation of knowledge graph generator 65, according to one or more embodiments. Knowledge graph generator 65 may receive semantic model 55 generated from Ontology generator 40 and data object model 60, may combine, or associate, semantic model 55 and data object model 60, and provide knowledge graph 811 in semantic web standards.

As shown in FIG. 8, knowledge graph generator 65 may combine, or associate, generated data object model 60 from business data 25 with finalized semantic model 55 to create knowledge graph 811 for a single domain. As shown in FIG. 8, knowledge graph 811 includes generated data object model 60 from business data 25 layered into finalized semantic model 55. For example, finalized semantic model 55 may show that entity "Material" may have a relationship ("IS_SUPPLIED_BY") with entity "Vendor" (including properties such as Name, City, and Postal Code). Knowledge graph 811 includes the data for entity "Vendor" (including properties such as Name, City, and Postal Code) from generated data object model 60 from business data 25.

Figure 9:
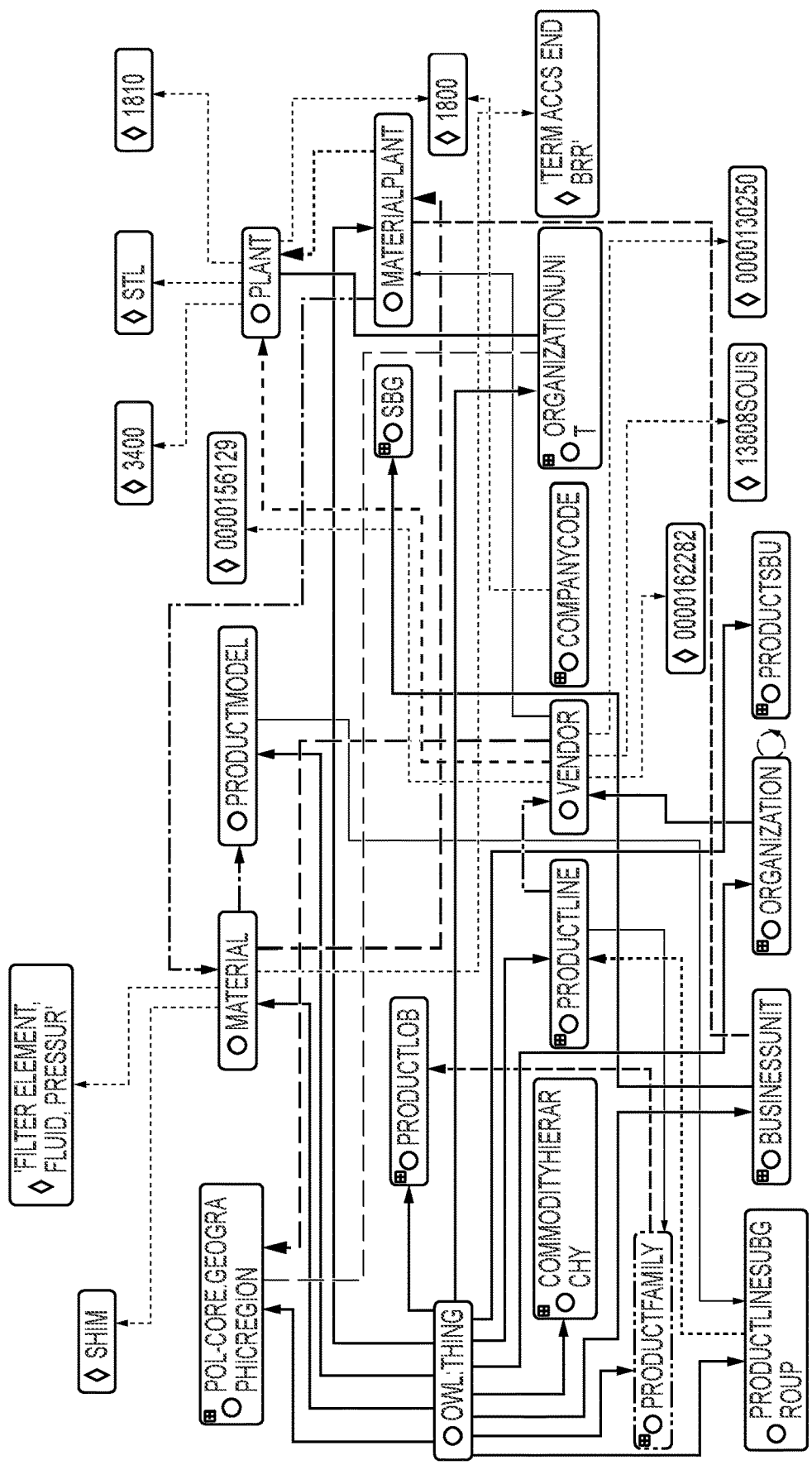
FIG. 9 depicts a visualization of knowledge graph 811 generated by knowledge graph generator 65 of FIG. 2, according to one or more embodiments.

FIG. 9 depicts a visualization of knowledge graph 811, according to one or more embodiments. As shown in FIG. 9, knowledge graph 811 may include root class "owl:Thing" connected by various relationships (from finalized semantic model 55) to other classes (from finalized semantic model 55), along with data from data object model 60 from business data 25 layered into finalized semantic model 55. For example, root class "owl:Thing" is connected to class "material" with data "SHIM".

Figure 10:
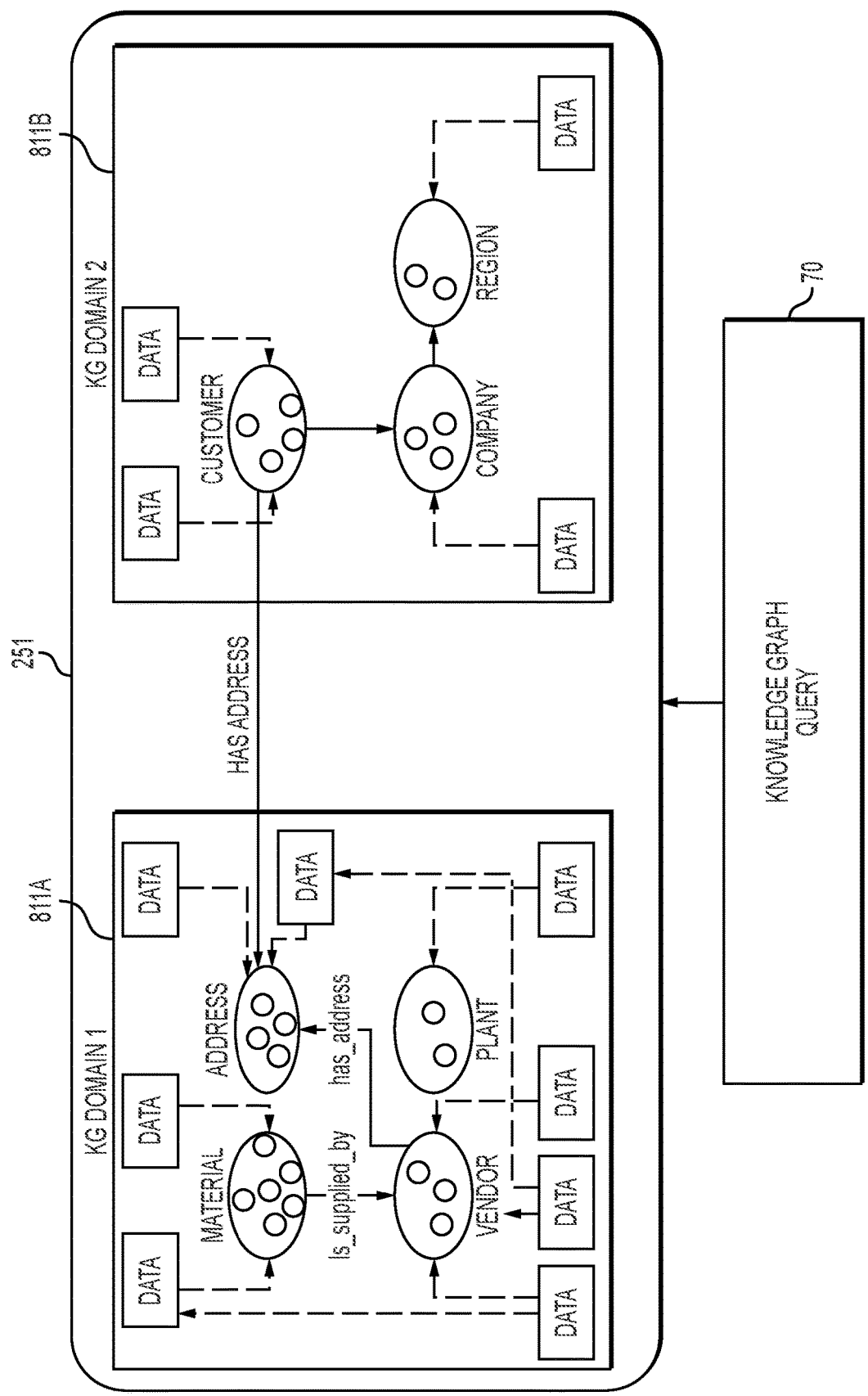
FIG. 10 depicts an implementation of query analyzer 70 of FIG. 2, according to one or more embodiments.

FIG. 10 depicts an implementation of query analyzer 70, according to one or more embodiments. FIG. 8 depicts an implementation of knowledge graph generator 65 to create a single knowledge graph 811. As shown in FIG. 10, the process may be repeated for other domains with data different from data in source data 15 to create additional knowledge graphs, such as knowledge graph 811A and knowledge graph 811B, for example. Knowledge graph 811A and knowledge graph 811B from multiple domains may be merged to create cross-domain analytics knowledge graph 251. Query analyzer 70 may provide cross-domain analytics from knowledge graph 251.

For example, entity "Address" may be created in knowledge graph 811A and may have a relationship with entity "Vendor". Additionally, entity "Address" may be created in knowledge graph 811B and may have a relationship with entity "Customer". However, when knowledge graph 811A and knowledge graph 811B are merged, knowledge graph 251 may merge the entity "Address" from knowledge graph 811B with the entity "Address" from knowledge graph 811A. Here the merged data in knowledge graph 251 may be de-duplicated, cleaned, and verified as necessary. Query analyzer 70 may provide cross-domain analytics from knowledge graph 251. For example, query analyzer 70 may return results for top vendors who are also top customers.

Figure 11:
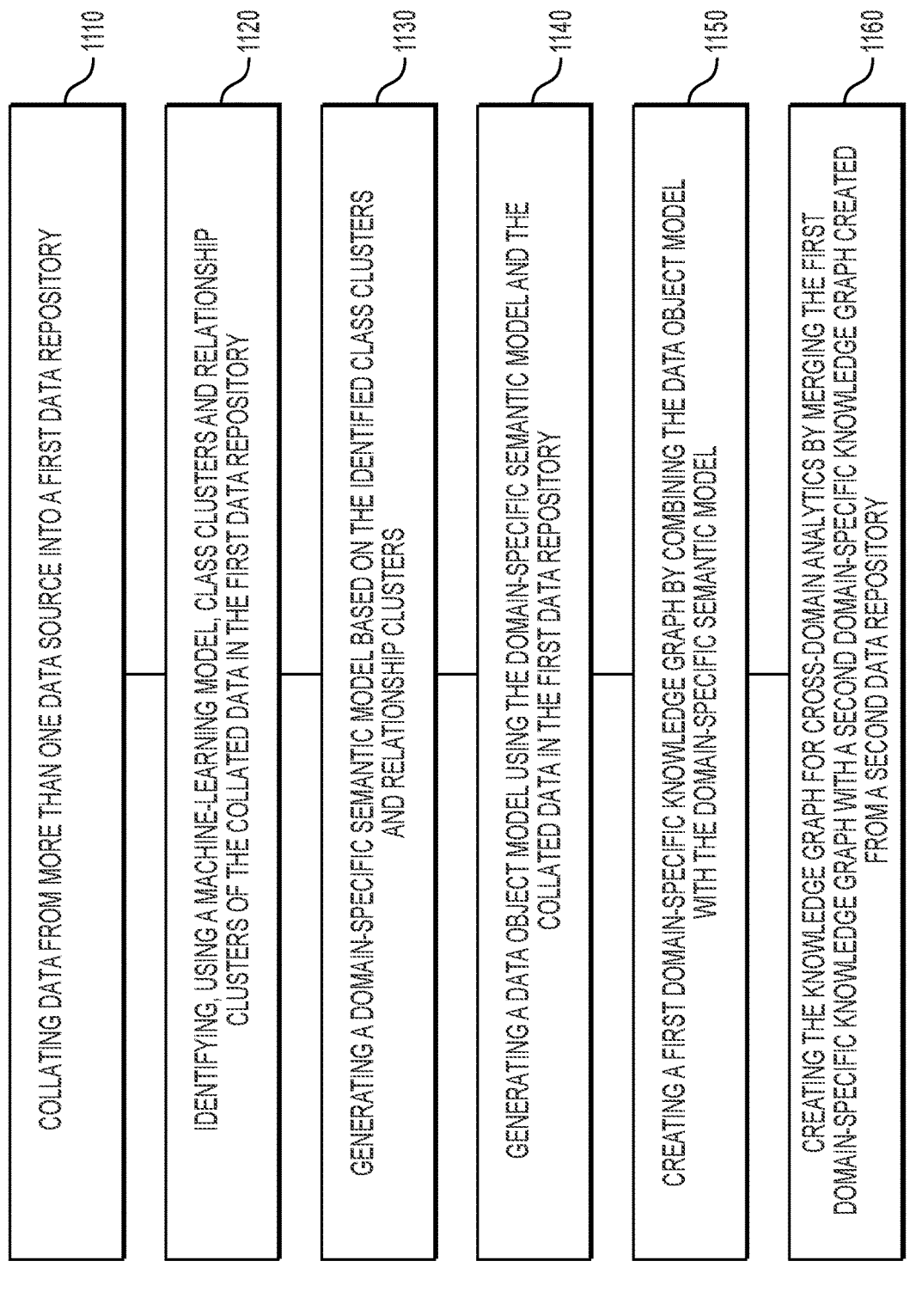
FIG. 11 depicts a flowchart of a method of creating a cross-domain analytics knowledge graph, according to one or more embodiments.

FIG. 11 depicts a flowchart of a method of creating a cross-domain analytics knowledge graph, according to one or more embodiments. As shown in FIG. 11, method 1100 may include various operations, and may be implemented by controller 300. Method 1100 may include collating data from a plurality of data sources into a first data repository (operation 1110) such as business data 25, for example. The collated data in the first centralized data repository may be a spreadsheet file. Method 1100 may include identifying, using a machine-learning model 30 to identify class clusters and relationship clusters, class clusters and relationship clusters of the collated data in the first data repository, wherein the class clusters represent relationships of data and the relationship clusters represent relationships between class clusters (operation 1120). The identifying the class clusters and relationship clusters may include using a trained neural network of class clusters and relationship clusters as machine-learning model 30. Method 1100 may include generating a domain-specific semantic model 55 as a graph-structured data model based on the identified class clusters and relationship clusters (operation 1130). Method 1100 may include generating a data object model 60 using the domain-specific semantic model 55 and the collated data in the first centralized data repository (operation 1140). Method 1100 may include creating a first domain-specific knowledge graph 811A by associating the data object model 60 with the domain-specific semantic model 55 (operation 1150). Method 1100 may include creating the cross-domain analytics knowledge graph 251 for deriving insights involving cross-domain analytics by merging the first domain-specific knowledge graph 811A with a second domain-specific knowledge graph 811B created from a second data repository (operation 1160). Method 1100 may include deriving insights corresponding to performance of one or more of an asset or a process in a facility based on utilization of the cross-domain analytics knowledge graph 251. Method 1100 may include providing the cross-domain analytics knowledge graph in an extensible object model in an Internet-of-Things platform.

Figure 12:
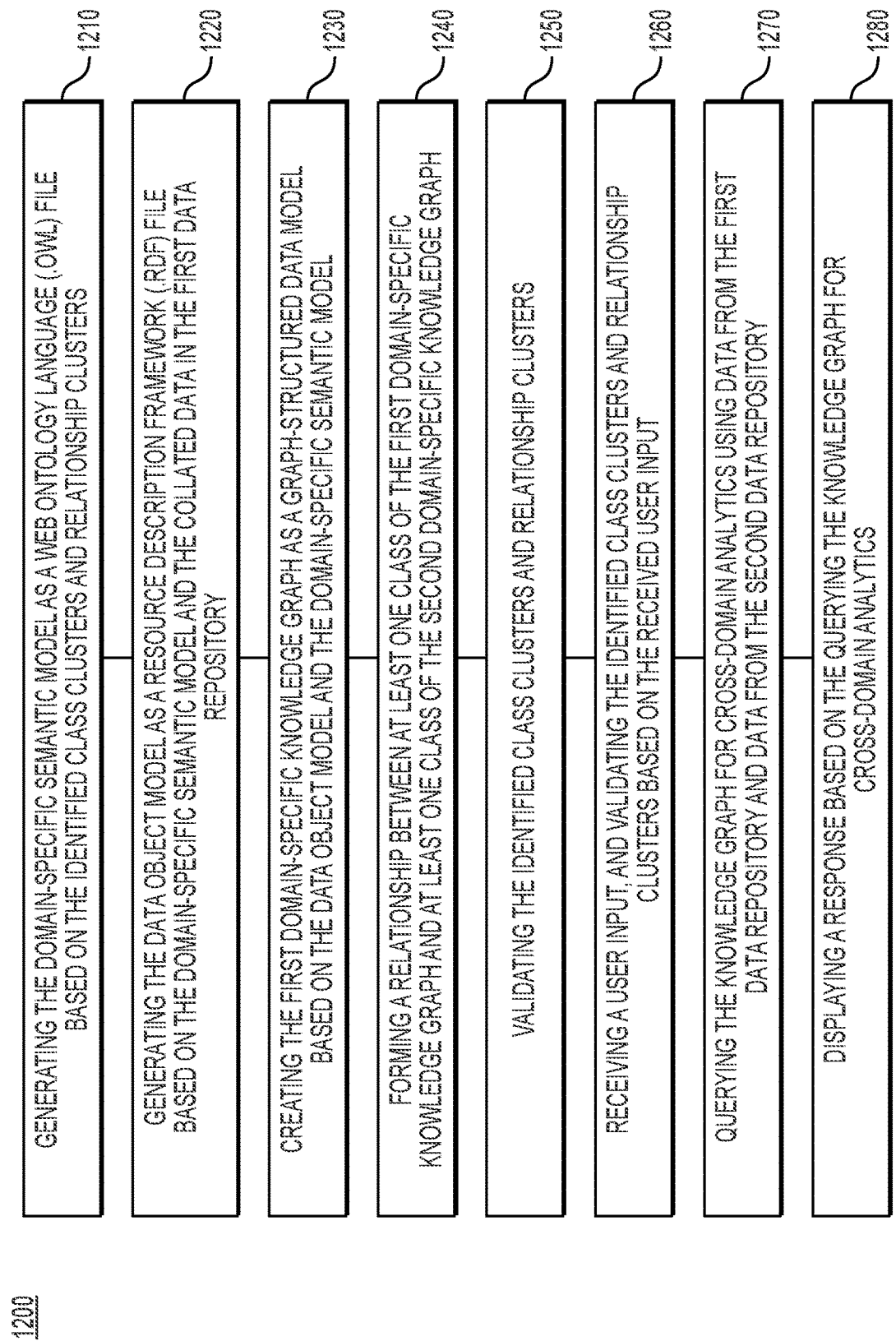
FIG. 12 depicts a flowchart of a method of creating a cross-domain analytics knowledge graph, according to one or more embodiments.

FIG. 12 depicts a flowchart of a method of creating a cross-domain analytics knowledge graph, according to one or more embodiments. As shown in FIG. 12, method 1100 may also include other operations, described here as various operations of method 1200. Generating the domain-specific semantic model 55 (operation 1130) may include generating the domain-specific semantic model 55 as a Web Ontology Language (.owl) file based on the identified class clusters and relationship clusters (operation 1210). Generating the data object model 60 (operation 1140) may include generating the data object model 60 as a Resource Description Framework (.rdf) file based on the domain-specific semantic model 55 and the collated data in the first centralized data repository (operation 1220). Creating the first domain-specific knowledge graph 811A (operation 1150) may include creating the first domain-specific knowledge graph 811A as a graph-structured data model based on the data object model 60 and the domain-specific semantic model 55 (operation 1230). Creating the cross-domain analytics knowledge graph 251 (operation 1160) may include forming a relationship between at least one class of the first domain-specific knowledge graph 811A and at least one class of the second domain-specific knowledge graph 811B (operation 1240). Method 1200 may include validating 35 the identified class clusters 37/38 and relationship clusters 39 (operation 1250). Method 1200 may include receiving a user input, and validating 35 the identified class clusters and relationship clusters based on the received user input (operation 1260). Method 1200 may include querying, using query analyzer 70, the cross-domain analytics knowledge graph 251 using data from the first centralized data repository and data from the second centralized data repository (operation 1270). Method 1200 may include displaying a response based on the querying the cross-domain analytics knowledge graph 251 (operation 1280).

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
    collating by one or more processors, data from a plurality of data sources into a first data repository;
    identifying by the one or more processors, using a machine-learning model, class clusters and relationship clusters of the collated data in the first data repository, wherein the class clusters are identified based on one or more properties associated with the collated data, and the class clusters represent relationships of data and the relationship clusters represent relationships between class clusters;
    generating by the one or more processors, a domain-specific semantic model as a graph-structured data model based on the identified class clusters and relationship clusters;
    generating by the one or more processors, a data object model using the domain-specific semantic model and the collated data in the first data repository;
    creating by the one or more processors, a first domain-specific knowledge graph by associating the data object model with the domain-specific semantic model;
    creating by the one or more processors, a cross-domain analytics knowledge graph for deriving insights involving cross-domain analytics by merging the first domain-specific knowledge graph with a second domain-specific knowledge graph created from a second data repository, wherein said creating the cross-domain analytics knowledge graph comprises forming a relationship between at least one class of the first domain-specific knowledge graph and at least one class of the second domain-specific knowledge graph;
    validating by the one or more processors, the identified class clusters and relationship clusters based on one or more inputs from a user received from a user interface, wherein validating the identified class clusters and relationship clusters comprises at least one of: modifying a name of a cluster by the machine-learning model based on a property of the cluster and modifying a relationship name of a relationship cluster by the machine-learning model based on a relationship between at least two clusters;
    deriving by the one or more processors, one or more actionable insights corresponding to performance of one or more of an asset or a process in a facility based on utilization of the cross-domain analytics knowledge graph; and displaying by the one or more processors, at least one actionable insight based on the one or more actionable derived insights for the cross-domain analytics knowledge graph.

2. The method of claim 1, wherein the identifying the class clusters and relationship clusters includes using a trained neural network of class clusters and relationship clusters as the machine-learning model.

3. The method of claim 1, wherein the generating the domain-specific semantic model includes generating the domain-specific semantic model as a Web Ontology Language (.owl) file based on the identified class clusters and relationship clusters.

4. The method of claim 1, wherein the generating the data object model includes generating the data object model as a Resource Description Framework (.rdf) file based on the domain-specific semantic model and the collated data in the first data repository.

5. The method of claim 1, wherein the creating the first domain-specific knowledge graph includes creating the first domain-specific knowledge graph as a graph-structured data model based on the data object model and the domain-specific semantic model.

6. The method of claim 1, wherein the deriving insights includes:
querying the cross-domain analytics knowledge graph using data from the first data repository and data from the second data repository.

7. The method of claim 6, wherein the deriving insights further includes:
displaying a response based on the querying the cross-domain analytics knowledge graph.

8. The method of claim 1, further comprising:
providing the cross-domain analytics knowledge graph in an extensible object model in an Internet-of-Things platform.

9. A system comprising:
a memory storing instructions; and
one or more processors to execute the stored instructions to perform operations including:
collating data from a plurality of data sources into a first data repository;
identifying, using a machine-learning model, class clusters and relationship clusters of the collated data in the first data repository, wherein the class clusters are identified based on one or more properties associated with the collated data, and the class clusters represent relationships of data and the relationship clusters represent relationships between class clusters;
generating a domain-specific semantic model as a graph-structured data model based on the identified class clusters and relationship clusters;
generating a data object model using the domain-specific semantic model and the collated data in the first data repository;
creating a first domain-specific knowledge graph by associating the data object model with the domain-specific semantic model;
creating a cross-domain analytics knowledge graph for deriving insights involving cross-domain analytics by merging the first domain-specific knowledge graph with a second domain-specific knowledge graph created from a second data repository, wherein said creating the cross-domain analytics knowledge graph includes forming a relationship between at least one class of the first domain-specific knowledge graph and at least one class of the second domain-specific knowledge graph;

validating the identified class clusters and relationship clusters based on one or more inputs from a user received from a user interface, wherein validating the identified class clusters and relationship clusters comprises at least one of: modifying a name of a cluster by the machine-learning model based on a property of the cluster and modifying a relationship name of a relationship cluster by the machine-learning model based on a relationship between at least two clusters;

deriving one or more actionable insights corresponding to performance of one or more of an asset or a process in a facility based on utilization of the cross-domain analytics knowledge graph; and displaying at least one actionable insight based on the one or more actionable derived insights for the cross-domain analytics knowledge graph.

10. The system of claim 9, wherein the identifying the class clusters and relationship clusters includes using a trained neural network of class clusters and relationship clusters as the machine-learning model.

11. The system of claim 9, wherein the generating the domain-specific semantic model includes generating the domain-specific semantic model as a Web Ontology Language (.owl) file based on the identified class clusters and relationship clusters.

12. The system of claim 9, wherein the generating the data object model includes generating the data object model as a Resource Description Framework (.rdf) file based on the domain-specific semantic model and the collated data in the first data repository.

13. The system of claim 9, wherein the creating the first domain-specific knowledge graph includes creating the first domain-specific knowledge graph as a graph-structured data model based on the data object model and the domain-specific semantic model.

14. The system of claim 9, wherein the deriving insights includes:
querying the cross-domain analytics knowledge graph using data from the first data repository and data from the second data repository, and
displaying a response based on the querying the cross-domain analytics knowledge graph.

15. The system of claim 14, further comprising:
providing the cross-domain analytics knowledge graph in an extensible object model in an Internet-of-Things platform.

16. A non-transitory computer-readable medium storing instructions that, when executed by one or more processors, cause the one or more processors to perform operations comprising:
collating data from a plurality of data sources into a first data repository;
identifying, using a machine-learning model, class clusters and relationship clusters of the collated data in the first data repository, wherein the class clusters are identified based on one or more properties associated with the collated data, and the class clusters represent relationships of data and the relationship clusters represent relationships between class clusters;
generating a domain-specific semantic model as a graph-structured data model based on the identified class clusters and relationship clusters;

generating a data object model using the domain-specific semantic model and the collated data in the first data repository;

creating a first domain-specific knowledge graph by associating the data object model with the domain-specific semantic model;

creating a cross-domain analytics knowledge graph for deriving insights involving cross-domain analytics by merging the first domain-specific knowledge graph with a second domain-specific knowledge graph created from a second data repository, wherein said creating the cross-domain analytics knowledge graph includes forming a relationship between at least one class of the first domain-specific knowledge graph and at least one class of the second domain-specific knowledge graph;

validating the identified class clusters and relationship clusters based on one or more inputs from a user received from a user interface, wherein validating the identified class clusters and relationship clusters comprises at least one of: modifying a name of a cluster by the machine-learning model based on a property of the cluster and modifying a relationship name of a relationship cluster by the machine-learning model based on a relationship between at least two clusters;

deriving one or more actionable insights corresponding to performance of one or more of an asset or a process in a facility based on utilization of the cross-domain analytics knowledge graph; and displaying at least one actionable insight based on the one or more actionable derived insights for the cross-domain analytics knowledge graph.

17. The method of claim 1, wherein said deriving insights further comprising identifying one or more faults for the derived insights, and wherein the one or more faults are identified by comparing current and predicted performances of the derived insights.

18. The method of claim 17, further comprising;

providing one or more recommendations for the identified one or more faults, and wherein the one or more recommendations are prioritized based on at least one impact of the identified one or more faults.

* * * * *